May 12, 1970     O. W. SWENSON     3,511,439
EGG COUNTING MACHINE
Filed Aug. 23, 1968     2 Sheets-Sheet 2
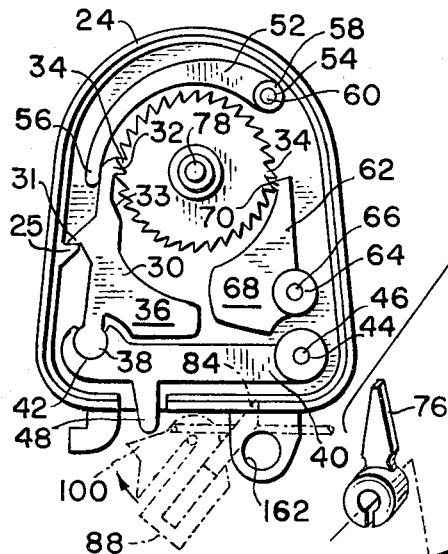
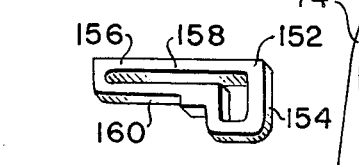
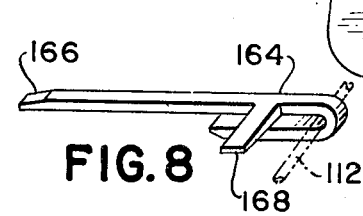
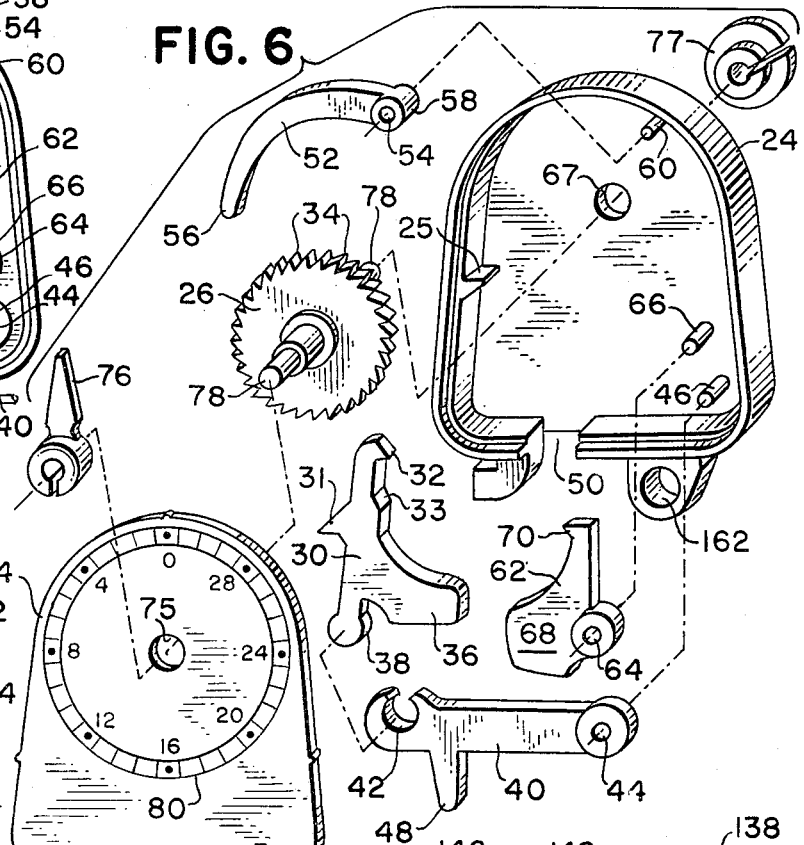
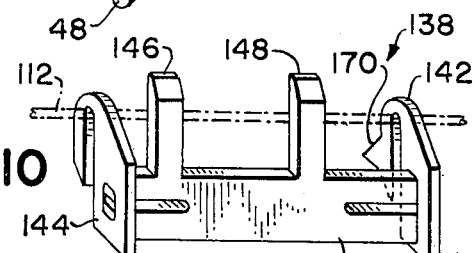
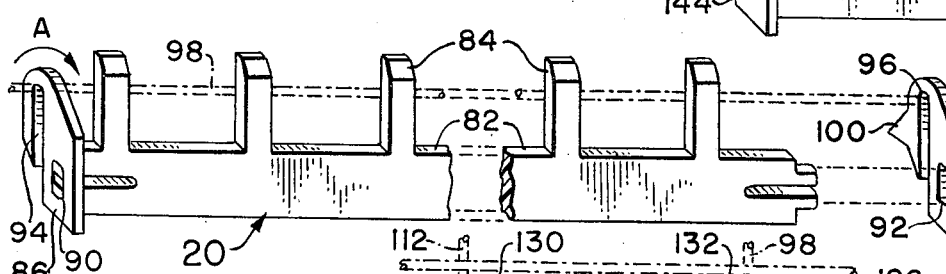
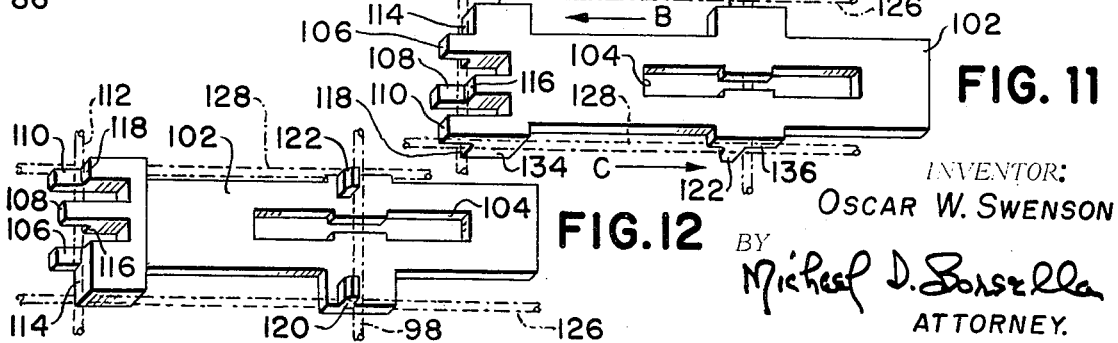
INVENTOR:
OSCAR W. SWENSON
BY Michael D. Bonsella
ATTORNEY.

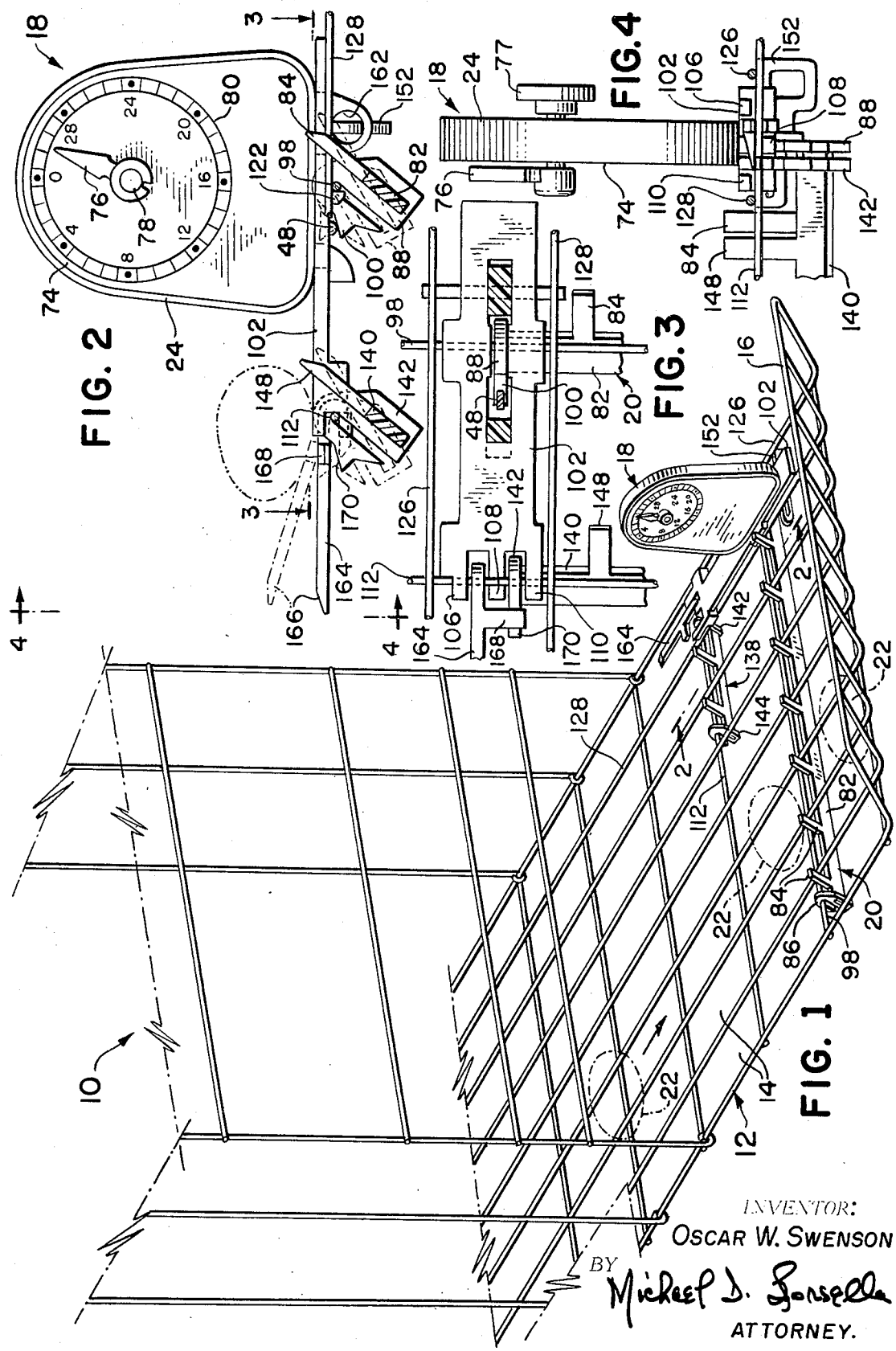

United States Patent Office 3,511,439
Patented May 12, 1970

3,511,439
EGG COUNTING MACHINE
Oscar W. Swenson, 211 Lorraine Ave.,
Upper Montclair, N.J. 07043
Filed Aug. 23, 1968, Ser. No. 767,558
Int. Cl. G06m 7/00, 1/08
U.S. Cl. 235—98                                    8 Claims

ABSTRACT OF THE DISCLOSURE

The device of this invention may be briefly described as a ratchet wheel counter which is constructed from a minimum number of parts each capable of being precisely mass produced extremely cheaply and capable of being assembled and installed without the use of tools by totally unskilled labor. It nevertheless contains means for register locking during non-counting periods, protective means against inaccurate counts, and protective means against damage by the fowl. Furthermore, the device may be installed without further modification on existing chicken coops and compartments of the currently popular type, such as for example, although not exclusively, the hen compartments manufactured by the Pockman Company or the Cumberland Company.

The present invention relates generally to numerical counters and more particularly to a lever operated counter which is especially adapted to be used for the counting of chicken egg production.

OBJECTS

It is one of the objects of the present invention to provide a simple and economical device for keeping count of the egg production of individual hens.

Another object of the invention is to provide a novel device of the above indicated nature which shall be cheap to mass produce, and easily installable, yet positive and reliable in operation.

Still another object of the invention is to provide an egg counting device for an egg production complex which embodies protective means whereby the egg producing fowl cannot interfere with the counting accuracy of the device.

Further objects and advantages will appear more fully hereinafter from a consideration of the detailed description which follows, taken together with the accompanying drawings wherein one embodiment of the invention is illustrated by way of example. It is to be expressly understood however, that the drawings are for the purpose of illustration only and are not to be construed as defining the limits of the invention, reference being had for that purpose to the appended claims.

PRIOR ART

Egg production methods have developed in recent years to a point where the fowl is retained permanently within a small wire cage, food being supplied automatically so that a great savings in labor is effected.

Tiers of cages containing one hen in each cage thus occupy sizeable buildings, and the identity of individual fowls is completely lost. It remains the fact however, that the quantity of egg production varies considerably from one hen to another. It is obvious that means are required to quickly observe the falling off in egg production in any individual fowl. In this manner the unproductive fowl can be quickly replaced and the quantity of egg production can be maintained at a maximum. This type of vigilance can only be accomplished by the adoption of automatic means for keeping a record of the egg production of each fowl.

The eggs as they are produced are generally caused to roll automatically out of the cage and into a trough. Their egress from the cage has been used in the past to operate a counter which recorded a total of egg production by each individual fowl.

One of the difficulties encountered with systems of this nature heretofore has been that of cost. A heavy investment in counters must be made since one for each fowl is required.

Other unsatisfactory prior art means comprised simply providing a card for each fowl upon which a check mark was manually made by the collector of the eggs each time he observed that a hen had produced an egg. At times the date was also recorded on the card. This method obviously is too rudimentary to be compared in facility of operation and in effectiveness with the herein disclosed device, since labor costs tend continuously to mount and furthermore the human error in keeping track of such large numbers of hens is inevitable.

Other prior art devices, while of the automatic type can only be installed by cutting out part of the existing chicken cage and thus entail a waste, in addition to the troublesome installation problem in fitting them into place on the cage. This too involves considerable labor costs when the job must be done for each individual cage.

In certain other counter types it has occurred that the force required to operate the counter was greater than that supplied by a rolling egg with the result that the passage of the egg was blocked.

FIELD OF INVENTION

As heretofore indicated, the greater utility of the device of this invention resides in the egg production field, and particularly in those modern installations referred to as egg factories. In these modern egg factories thousands of hens are individually housed in their own wire cages and never emerge therefrom until they are removed from production, generally by becoming unproductive in egg laying to the point where it is no longer profitable to keep them.

The within invention provides positive and reliable means, easily installable on each cage for quickly and automatically keeping track of the egg production of each hen.

A crucial advantage of the instant device is that all of the aforementioned objects and advantages are achieved by the exclusive use of molded parts so that an entire counter, or a plurality of them can be produced by injection molding made of a suitable plastic material within a matter of seconds, by a single stroke of the injection molding machine.

Because of the high costs involved in production, previous counters have not been commercially successful. It is only by these means that it is now possible to produce a complete set of parts for a counter at a cost which is low enough to make its purchase in large quantities attractive and feasible in the large quantities required for effective comparison between the hens in their egg producing ability. Obviously, a very large number of the device is needed to complete the installation in one single egg factory, since the advantage of egg counting is realizable only by providing substantially all of the cages.

In the drawings wherein like reference characters indicate like parts:

FIG. 1 is a partial view in perspective of a typical compartment for one fowl with an apron attached thereto having the counter of this invention installed thereon.

FIG. 2 is an elevation view of a novel counter assembly herein disclosed, taken along the line 2—2 of FIG. 1, looking in the direction of the arrows.

FIG. 3 is a view taken along the line 3—3 of FIG. 2, looking in the direction of the arrows.

FIG. 4 is a view taken along the line 4—4 of FIG. 2 looking in the direction of the arrows.

FIG. 5 is an elevation view showing the counter mechanism in the interior of the counter.

FIG. 6 is an exploded view of the counter assembly.

FIG. 7 is a perspective view showing a locking key for the counter mechanism.

FIG. 8 is a perspective view of the trip bar lever component of the mechanism.

FIG. 9 is a perspective view partly exploded of the trip bar assembly of the herein disclosed mechanism.

FIG. 10 is a perspective view of the decoy bar assembly of the counter herein disclosed.

FIG. 11 is a top view of an adapter mounting plate for the counter assembly, showing the plate mounted on the apron of FIG. 1.

FIG. 12 is a bottom view of the adapter plate of FIG. 11, mounted in position on the apron of FIG. 1.

DESCRIPTION OF PREFERRED EMBODIMENTS

Referring now to the drawings and more particularly to FIG. 1, there is shown a portion of a typical wire compartment which in commercial applications hereinbefore referred to as "egg factories" would ordinarily house one fowl. The compartment is generally designated by the numeral 10. An apron 12 emerges from the compartment 10 in a gently downward sloping manner (FIG. 1). The fowl is contained within the compartment 10. The eggs laid by the fowl are deposited upon the apron 12. The compartment 10 as well as the apron 12 are generally made from galvanized wire approximately .080 inch in diameter, intercrossed more or less as shown, so that an egg cannot pass through any of the typical apertures such as 14 (FIG. 1). Hence, the eggs roll quietly down the apron 12 owing to its slope, and come to rest against an apron guard 16 (FIG. 1), from whence they are collected.

Intermediate the compartment 10 and the apron 12, there is installed the counter assembly of this invention, generally designated by the numeral 18 (FIGS. 1 and 2).

A trip bar assembly 20 extends all across the apron 12 so that an egg rolling down the ramp cannot come to rest against the apron guard 16 without passing over and tripping the bar assembly 20 (FIG. 1). The typical travel of an egg 22, is shown in FIG. 1 in three different stages of its journey. Firstly, emerging from the compartment 10. Secondly, in a position about to pass over and trip the trip bar assembly 20, and finally resting against the apron guard 16.

The trip bar assembly 20 is connected to the counter assembly 18 as hereinafter explained, so that all of the eggs laid by the fowl in the compartment 10 must necessarily pass over the trip bar 20 and be registered upon the counter assembly 18.

COUNTER ASSEMBLY INTERNAL MECHANISM

Referring now to FIGS. 5 and 6, there is shown a mechanism casing 24 having a conventional ratchet wheel 26 centrally pinned thereto, as at center point 78. The ratchet wheel 26 is rotatable between a point 67 in the casing 24 and a point 75 in the face plate 74 (FIG. 6). A feed pawl 30 is disposed substantially vertically within the casing 24 and embodies a toothed end 32 ordinarily in mating engagement with the teeth 34 of the ratchet wheel 26 (FIG. 5). As hereinafter explained, a reciprocating motion of the feed pawl 30 is converted into a rotary motion of the wheel 26. The feed pawl 30 also embodies a weighted portion 36 at the opposite end thereof from the toothed end 32, and embodies stop lug 31 and camming area 33, and also embodies a boss contoured portion 38.

Engaging the boss portion 38 of the feed pawl 30 is a feed pawl lever 40, disposed substantially horizontally within the casing 24. The feed pawl lever 40 embodies a socket portion 42 adapted to mate with and contain the boss 38 of the feed pawl 30 (FIGS. 5 and 6) on one end thereof, and on the opposite end is attached to a pivot point 44 wherein the lever pivots about a pin 46 attached to the casing 24.

The feed pawl lever 40 also embodies a contact lever arm portion 48 integral therewith. The lever arm portion 48 extends downwardly through a slot 50 in the casing 24 and is adapted to make contact with and be actuated by the trip bar assembly 20, as hereinafter explained.

A press plate 52 is disposed within the casing 24 and suitably attached thereto. The press plate 52 pivots about a pivot point 54 in response to pressure from the feed pawl 30. The press plate 52 is substantially arcuate in contour about the ratchet wheel 26, and bears against the feed pawl 30 on one end 56 thereof. The opposite end 58 is pinned to the casing 24 at the pivot point 54 by means of a pin 60. Thus an upward movement of the feed pawl 30 will cause the press plate 52 to pivot about the pivot point 54. However, the weight of the press plate 52 will continuously tend to bias the feed pawl 30 into contact with the ratchet wheel 26 (FIG. 5). The upward movement of feed pawl 30 will belatedly cause cam 30 to contact ratchet wheel 26 and kick out feed pawl 30 to prevent point 32 from engaging more than one tooth at a time.

Diametrically across the ratchet wheel 26 from the engagement point 32 on the feed pawl 30 there is disposed a detent 62. The detent 62 lies subtsantially vertically within the casing 24 and pivots about a pivot point and pin, 64 and 66 respectively. The detent 62 also embodies a weighted portion 68 on one end and a toothed area 70 on the opposite end. The toothed portion 70 engages the ratchet wheel 26 such as at tooth 34 for example (FIG. 5), and prevents rotary motion of the wheel in a clockwise direction. The weighted portion 68 of the detent tends to continuously bias the toothed area into engagement with the wheel 26. The detent cam 62 however, does not prevent rotary motion of the ratchet wheel in a counter-clockwise direction owing to the slope of the tooth 34 and the toothed area 70. In fact any rotary motion of the ratchet wheel will cause the detent to pivot about the point 64 outwardly away from the ratchet wheel. Hence, the wheel 26 is orientated towards counter clockwise motion only.

Referring now to FIGS. 2 and 6, it will be observed that the exterior of the mechanism casing 24 embodies a counter dial face 74 around which an indicator 76 centrally pinned thereon as by pin 78 is adapted to sweep. The pin 78 is also the outer hub for the ratchet wheel 26, which is firmly mounted thereon. Hence as the wheel 26 moves each notch in a counter clockwise direction, the indicator 76 will move a corresponding distance (FIGS. 2 and 5). A reading scale 80, on the dial face 74 is disposed so that each time the ratchet wheel 26 moves by one tooth, the indicator 76 will move by one gradation on the scale 80. Means are provided for resetting the counter mechanism indicator 76 to zero on the reading scale 80, by a knob 77 attached to the pin 78 of the ratchet wheel 26.

TRIP BAR ASSEMBLY MECHANISM

Referring now to FIGS. 1 and 9 for a detailed consideration of the trip bar assembly 20, there is shown a substantially rectangular continuous bar 82 extending across the apron 12 of the compartment 10. The bar 82 embodies a plurality of trip lugs 84 integral therewith and extending upwards from the bar at suitable intervals along the length thereof. The lugs 84 are sufficiently close together so that the egg 22 cannot possibly pass therebetween. The trip bar assembly 20 is installed onto the apron 12 by means of a trip bar hanger 86 on one end thereof, and a trip bar hanger and counter actuator 88. The trip bar hanger 86 and the hanger and actuator 88 each contain a slot 90 and 92 respectively (FIG. 9) adapted to mate and hold in press fit fashion the bar 82. The hanger 86 and the actuator 88 also respectively contain pivot slots 94 and 96 for enfolding a wire 98 of the apron 12. Thus the trip bar assembly hangs onto the apron 12 of the wire compartment 10 in a pivotable manner about the wire 98. Thus any egg, such as 22 rolling down the ramp 12 will necessarily strike one of the trip lugs 84 thus causing the trip bar assembly to pivot in clockwise manner so as to allow the egg to pass thereover. It will be noted that slots 94 and 96 respectively in the trip bar hanger 86 and the actuator 88 are disposed off-center. Furthermore, the apron 12 slopes at an angle. In its "at rest" position, the trip bar assembly 20 hangs in delicate balance upon the wire 98 so that when an egg passes over the trip bar assembly causing it to rotate along the path indicated by the arrow A (FIG. 9), the weight of the bar assembly will be unbalanced tending to cause the assembly to pivot contrary to the arrow A and hence return automatically to rest in its normal balanced position.

The cooperation between the trip bar assembly 20 and the counter assembly 18 is effected by means of the trip bar actuator 88. The actuator 88 embodies integral therewith a contact lug 100 (FIGS. 5 and 9) positioned with respect to the counter assembly 18 immediately beneath the contact lever arm portion 48 so that any clockwise pivotal movement of the trip bar assembly 20 and the actuator 88 will result in the contact lug 100 moving upwards against the lever arm portion 48 thus causing the feed pawl lever 40 to move upwards thereby setting into motion the various components within the mechanism casing 24 as hereinafter explained.

The mechanism casing 24 is mounted in its prescribed position with respect to the trip bar assembly 20, onto the apron 12 by means of an adapter plate 102 (FIGS. 11 and 12). The adapter plate 102 embodies a cutout 104 adapted to permit the contact lever arm portion 48 to pass and protrude therethrough so that it may be contacted by the contact lug 100 of the actuator 88. The plate 102 also embodies a plurality of fingers, three herein shown as numerals 106, 108, and 110 adapted to attach to a wire 112 of the apron 12. The fingers 106 and 110 rest above the wire 112, while the finger 108 rests below the wire. Hence coplanar surfaces 114, 116, and 118 restrain the plate from moving in a direction indicated by the arrow B (FIG. 11). A pair of restraining lugs 120 and 122 (FIG. 12) are positioned to bear against another wire 98 so that movement of the plate in the direction of arrow C (FIG. 11) is prevented. In a similar manner, lateral movement of the adapter plate 102 is prevented by the wires 126 and 128 bearing against the surfaces 130 and 132 and 134 and 136. It is to be understood that the wire compartment 10 is a typical wire compartment such as a Pockman type, hence the spacing of the wires thereon is well known in the art.

OPERATION

Having thus described the invention, it will now become obvious to those skilled in the art that as an egg 22 rolls down the apron 12 it will engage a trip lug 84 thus unbalancing the trip bar assembly 20 causing a clockwise rotation thereof. This in turn causes the contact lug 100 to bear against and push the contact lever arm portion 48 upwards. Thus the feed pawl 30 is in turn pushed upwards so that the toothed end 32 thereof is belatedly thrown out of engagement with the ratchet wheel 26 and the press plate 52 is forced outwards as it pivots about pivot point 54. The cam 33 aids in the disengaging the toothed end 32 from the ratchet wheel 26 by bearing against the wheel in the upwards motion of the feed pawl 20 (FIG. 5). It will be noted that the feed pawl cannot rotate the ratchet wheel as it moves upwards, because of the toothed area 70 on the detent cam 62 which is in engagement with the wheel 26. The feed pawl then drops back against the ratchet wheel 26 and is aided by the press plate 52; however, the feed pawl having been pushed upwards will upon descending engage the ratchet wheel one tooth higher by means of cam 33 and move the ratchet wheel by one tooth. Said movement in turn corresponds to one space on the counter dial face 74. The downward motion of the feed pawl 30 is arrested by stop lug 31 coming in contact with stop 25 in case 24.

Automatic means are thus provided for accurately keeping count of the number of eggs emerging from each compartment 10, and consequently the egg production of each fowl occuping the compartment can be accurately ascertained.

Locking means for holding the counter assembly firmly in place are provided by a locking key 152 (FIGS. 4 and 7). The locking key 152 comprises essentially an end portion 154 for grasping the key and a flexible locking portion 156. The locking key is constructed from a flat flexible material and embodies two parallel locking arms 158 and 160. When the locking key 152 is inserted in an eye 162 on the counter assembly (FIGS. 2 and 4) with the end portion 154 in a horizontal position, and the locking arms 158 and 160 are made to protrude through the eye 162 and placed under the wire 128, and the key is then turned ninety degrees, the flexible locking arms 158 and 160 will be forced to flex towards one another thus in effect wedging the counter assembly firmly in place. The wedging effect is achieved in that the position of the wire 128 on the wire compartment 10, with respect to the eye 162 is such that the wire passes across the top of the eye blocking off a portion thereof. When the key is inserted horizontally in the eye, the arms 158 and 160 pass readily beneath the wire. But when the key is turned ninety degrees, the wire interferes and the result is that the key is forced to flex. Thus simple and effective means are provided for mounting the counter assembly firmly in place.

DECOY OPERATION

Means are now described which are embodied in the invention as an intergral part thereof, to prevent or avoid the trip bar assembly 20 from becoming operative by reason of a fowl pecking against a trip lug 84 and accidently causing a count to be registered on the counter 18 when in effect no egg has passed over the trip bar assembly.

Referring to FIGS. 1 and 10, there is shown a decoy bar assembly 138. The decoy bar assembly 138 comprises a decoy bar 140 and decoy suspension lugs 142 and 144. Integral with the bar 138 are decoy trip lugs 146 and 148 (FIG. 10). The decoy bar assembly 138 is mounted onto a wire 112 by means of the decoy suspension lugs 142 and 144 in the same manner herein disclosed, as the trip bar assembly 20 is mounted upon the wire 98.

The entire decoy bar assembly 138 is yellow in color, while on the other hand, the trip bar assembly 20 is violet in color. This color selection is important in that it is well known in the trade that fowl cannot very well notice a violet object, whereas by contrast a yellow object is readily noticed by them and will furthermore attract their attention. Thus the yellow decoy bar assembly 138 functions to lure the fowl away from the trip bar assembly 20, by means of which a fowl might cause an incorrect count to be registered on the counter assembly 18.

Pecking at the decoy trip lugs 146 and 148 or otherwise causing the decoy bar assembly to operate will not interfere with the accuracy of the egg count, because there is no direct linkage connection between the decoy assembly 138 and the counter assembly 18. However, hinged upon the wire 112 (FIGS. 4 and 11), there is a trip bar lever 164. The trip bar lever 164 is disposed between the fingers 106 and 108 of the adapter plate 102 and comprises an elongated lever arm 166 and a contact lever 168. The contact lever 168 is disposed above a contact arm 170 on the decoy suspension lug 142 (FIGS. 4 and 10). Thus when the decoy bar assembly is actuated, as by a fowl pecking upon the trip lugs 146 and 148, the decoy suspension lugs 142 and 144 will pivot the decoy bar assembly in a clockwise direction and the contact arm 170 will bear upwards upon the lever arm 168 thus forcing the trip bar lever 166 to pivot about the wire 112. The lever arm 166 then will rise from its normally horizontal position, upwards to the approximate position shown in FIG. 2. In this manner any egg which has become entrapped behind the counter assembly 18 will be nudged by the lever arm 166 and freed to roll down the apron 12.

There are thus provided simple and effective means whereby the several objects of this invention are achieved.

While only one embodiment and one illustration of the invention has been shown and described, it will readily be apparent to those skilled in the art that changes and modifications may be made in the relative arrangement of the parts and in the components described without departing from the spirit and the scope of the invention.

What is claimed is:

1. In a device for counting the egg production of a fowl adapted to be installed on a fowl housing compartment, the combination comprising an apron for leading the eggs from the compartment, a trip bar assembly on said apron in the path of the eggs, a counting device operatively connected to said trip bar assembly, said trip bar assembly embodying means upon the passing of each egg thereover for advancing the counting device, and a decoy bar assembly mounted on said apron between said compartment and said trip bar assembly adapted to attract said fowl to peck thereon rather than on said trip bar assembly thereby maintaining the accuracy of said counting device.

2. The counting device claimed in claim 1, wherein said apron slopes downwards from the compartments, and the trip bar assembly extends substantially across the entire width of the apron said decoy bar assembly being yellow in color and said trip bar assembly being violet in color.

3. The counting device claimed in claim 1, wherein said trip bar assembly comprises a trip bar, a plurality of trip lugs extending upwards and disposed at suitable intervals along the length of the bar, a trip bar hanger and a counter actuator on said trip bar, so that an egg upon striking a trip lug causes the assembly to pivot about the hanger and actuator to advance said counting device by one unit count.

4. The device claimed in claim 1, wherein said decoy assembly comprises, a decoy bar, a plurality of suspension lugs mounting the assembly on said apron, a trip bar lever having an elongated arm and a contact lever, a plurality of trip lugs on the bar, so that upon actuating said lugs, the suspension lugs will pivot the bar assembly in a clockwise direction forcing the lever arm upwards to free an entrapped egg.

5. The device for counting the egg production of a fowl claimed in claim 1, wherein locking means for holding the counter in place comprise an end portion, a flexible locking portion including a plurality of flexible locking arms biased towards one another to wedge the counter assembly firmly in place against the apron.

6. The locking means claimed in claim 5, wherein the locking arms pass beneath the wire on the compartment, so that upon turning said means 90 degrees said means are forced to flex by said wire to lock the counter firmly in place.

7. A device for counting the egg production of a fowl adapted to be installed on a typical fowl housing compartment comprising means for leading the eggs from the compartment, a trip bar assembly on said means in the path of the eggs, a counting device operatively connected to said trip bar assembly, said trip bar assembly embodying means upon the passing of each egg thereover for advancing the counting device, the said counting device comprising a ratchet wheel pivotable on a casing mounted upon the apron, a unit count indicator, a feed pawl ordinarily engaged with the ratchet wheel, a feed pawl lever adapted to actuate the feed pawl, a press plate pivotable in response to pressure from the feed pawl, and tending to bias the fed pawl into contact with the ratchet wheel, a detent on the opposite side of the ratchet wheel from the feed pawl engaging the ratchet wheel to permit turning thereof only in a counterclockwise direction, so that upon upward movements of the feed pawl lever the feed pawl will actuate the ratchet wheel and the detent will allow the wheel to advance one tooth only to register one count on the unit count indicator of the counting device.

8. The device for counting the egg production of a fowl claimed in claim 7, wherein the counting device is readily removable from the apron and a contact lever extending downwards from the casing on the counting device is actuated by the counter actuator on the trip bar assembly each time an egg rolls over the trip bar assembly to register one count on the unit count indicator.

References Cited
UNITED STATES PATENTS

| | | | |
|---|---|---|---|
| 2,305,708 | 12/1942 | Jacobsen | 235—98 |
| 2,696,349 | 12/1942 | Baumstark | 235—98 |
| 2,827,875 | 3/1958 | Baumstark | 119—48 |
| 2,940,667 | 6/1960 | Hawkes | 235—91 X |
| 2,982,471 | 5/1961 | Eggink | 235—91 X |

RICHARD B. WILKINSON, Primary Examiner

S. A. WAL, Assistant Examiner

U.S. Cl. X.R.

235—91